(12) United States Patent
Wellenhofer et al.

(10) Patent No.: US 11,834,356 B2
(45) Date of Patent: Dec. 5, 2023

(54) PROCESS AND DEVICE FOR TREATING A WASTE LYE

(71) Applicant: LINDE GmbH, Pullach (DE)

(72) Inventors: Anton Wellenhofer, Hohenschäftlarn (DE); Jörg Zander, Munich (DE); Ekaterina Ananieva, Munich (DE); Florian Hairer, Munich (DE); Michael Baus, Gräfelfing (DE); Martin Schubert, Munich (DE)

(73) Assignee: LINDE GmbH, Pullach (DE)

( * ) Notice: Subject to any disclaimer, the term of this patent is extended or adjusted under 35 U.S.C. 154(b) by 231 days.

(21) Appl. No.: 17/051,124

(22) PCT Filed: Apr. 26, 2019

(86) PCT No.: PCT/EP2019/060804
§ 371 (c)(1),
(2) Date: Oct. 27, 2020

(87) PCT Pub. No.: WO2019/207138
PCT Pub. Date: Oct. 31, 2019

(65) Prior Publication Data
US 2021/0053853 A1    Feb. 25, 2021

(30) Foreign Application Priority Data

Apr. 27, 2018 (DE) .................. 10 2018 110 293.3
Jun. 19, 2018 (EP) ........................... 18178648

(51) Int. Cl.
*C02F 1/72* (2023.01)
*C02F 1/74* (2023.01)
(Continued)

(52) U.S. Cl.
CPC ............... *C02F 1/727* (2013.01); *C02F 1/74* (2013.01); *C02F 11/08* (2013.01); *C02F 2101/101* (2013.01); *C02F 2103/18* (2013.01)

(58) Field of Classification Search
None
See application file for complete search history.

(56) References Cited

U.S. PATENT DOCUMENTS 4,350,599 A    9/1982   Chowdhury
5,082,571 A    1/1992   Beula et al.

FOREIGN PATENT DOCUMENTS

CN          2432206 Y      5/2001
DE      102006030855 A1    1/2008
(Continued)

OTHER PUBLICATIONS

PCT/EP2019/060804 International Search Report and Written Opinion dated Jun. 27, 2019; 8 pages.
(Continued)

*Primary Examiner* — Magali P Slawski
*Assistant Examiner* — Brad Gordon
(74) *Attorney, Agent, or Firm* — Cozen O'Connor

(57) ABSTRACT

The invention relates to a process for treating a waste lye of a lye scrub using an oxidation reactor (100), the waste lye and oxygen or an oxygen-containing gas mixture being introduced into the oxidation reactor (100) and steam being introduced into the oxidation reactor (100). It is provided that the steam is at least partially introduced by means of a steam feeding device (10), which has a cylindrical section (11) with a centre axis (12) and a wall (13), the centre axis (12) being aligned perpendicularly, a number of groups of openings (14) being formed in the wall, each of the groups comprising a number of the openings (14), and the number of openings (14) of each of the groups being arranged in one
(Continued)

or more planes (15) that is or are in each case aligned perpendicularly to the centre axis (12). A corresponding installation and also a corresponding oxidation reactor (100) are likewise the subject of the present invention.

12 Claims, 1 Drawing Sheet

(51) Int. Cl.
*C02F 11/08* (2006.01)
*C02F 101/10* (2006.01)
*C02F 103/18* (2006.01)

(56) References Cited

FOREIGN PATENT DOCUMENTS

| | | | |
|---|---|---|---|
| DE | 102010049445 A1 | 4/2012 | |
| WO | WO-2006065766 A2 * | 6/2006 | ............. B01F 5/045 |

OTHER PUBLICATIONS

Ellis, C.E. "Wet Air Oxidation of Refinery Spent Caustic", Environmental Progress, vol. 17, No. 1, 1998, pp. 28-30.
Maugens, C.B. et al. "Wet Air Oxidation: A Review of Commercial Subcritical Hydrothermal Treatment", IT3'02 Conference, May 17, 2002 (May 17, 2002), 16 pages.

* cited by examiner

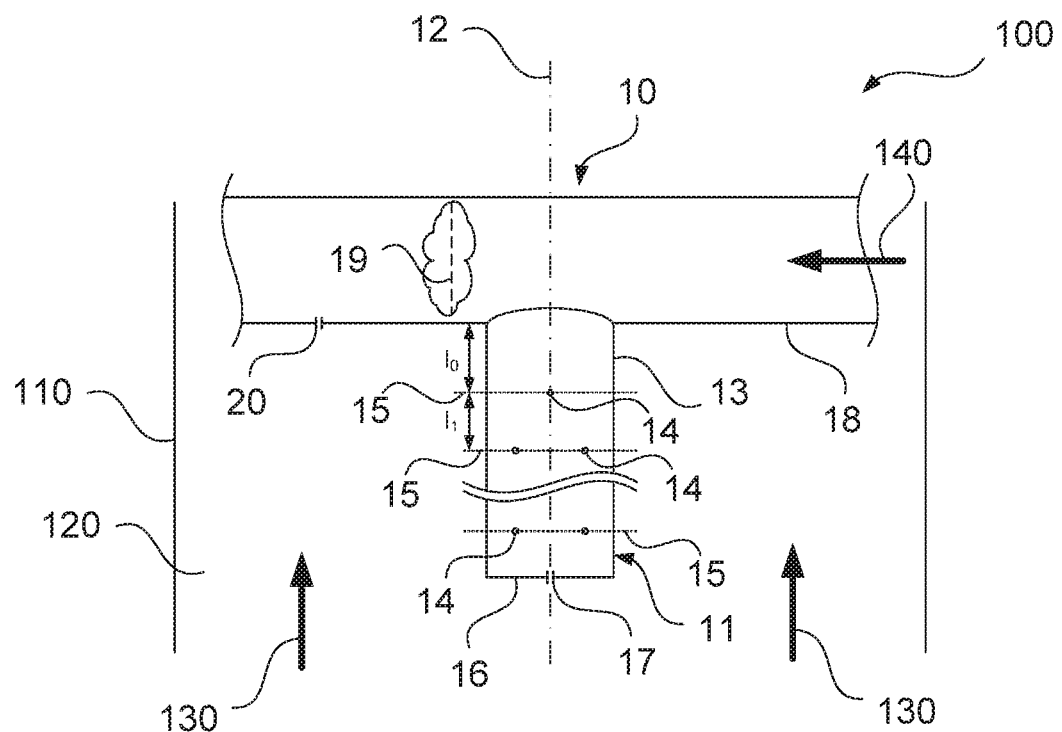
Fig. 1
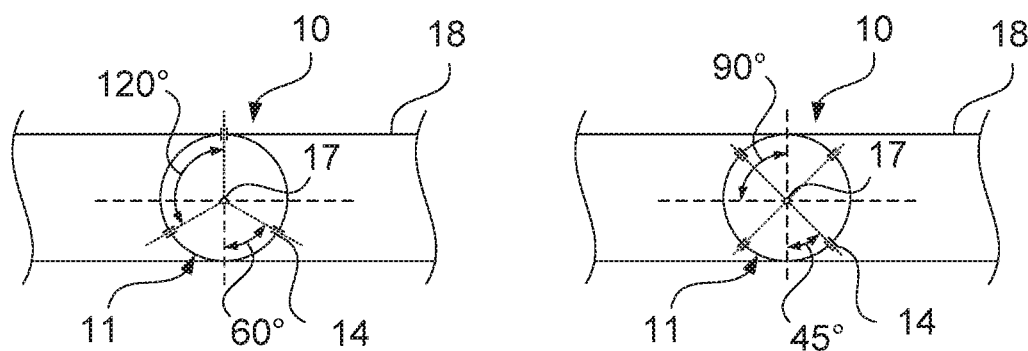
Fig. 2A  Fig. 2B

PROCESS AND DEVICE FOR TREATING A WASTE LYE

The invention relates to a process for treating a waste lye of a lye scrub using an oxidation reactor and to a corresponding installation and also a corresponding oxidation reactor according to the respective preambles of the independent patent claims.

PRIOR ART

Olefins such as ethylene or propylene, but also diolefins such as butadiene and aromatics can be produced from paraffin by steam cracking. Corresponding processes have long been known. For details, also see the specialist literature such as the article "Ethylene" in Ullmann's Encyclopedia of Industrial Chemistry, online edition, 15 Apr. 2007, DOI 10.1002/14356007.a10_045.pub2.

Steam cracking produces so-called cracked gas, which along with the target products contains unconverted hydrocarbons and undesired byproducts. In known processes, this cracked gas is first subjected to a processing treatment before it is passed on to a fractionation to obtain various hydrocarbons or hydrocarbon fractions. Details are described in the cited article, in particular in section 5.3.2.1, "Front-End Section" and 5.3.2.2., "Hydrocarbon Fractionation Section".

A corresponding processing treatment comprises in particular a so-called acid gas removal, in which components such as carbon dioxide, hydrogen sulfide and mercaptans are separated from the cracked gas. The cracked gas is typically compressed before and after a corresponding treatment. For example, the cracked gas may be removed from a so-called raw gas compressor at an intermediate pressure level, subjected to the acid gas removal, and subsequently compressed further in the raw gas compressor.

The acid gas removal may comprise in particular a so-called lye scrub using caustic soda solution. In particular when there are high concentrations of sulfur compounds, the lye scrub may also be combined with an amine scrub, for example by using ethanol amine. The waste lye obtained in the lye scrub, which contains several percent of sulfide and carbonate, is typically oxidized, and possibly neutralized, in a waste lye treatment before it can be subjected to a biological wastewater treatment. The oxidation serves for removing toxic components and for reducing the biological oxygen demand. The waste lye oxidation is typically carried out in the form of a chemical wet oxidation of the sulfide with oxygen in solution.

A number of different processes for wet oxidation of spent waste lyes are known from the prior art. For example, reference may be made to the article by C. B. Maugans and C. Alice, "Wet Air Oxidation: A Review of Commercial Sub-critical Hydrothermal Treatment", IT3'02 Conference, 13 to 17 May 2002, New Orleans, Lousiana, or U.S. Pat. No. 5,082,571 A.

In such processes, the spent waste lye may be brought to the desired reaction pressure and heated up in counter current with the oxidized waste lye. The heated spent waste lye may subsequently be introduced into an oxidation reactor while supplying oxygen and be oxidized. The oxygen required for the reaction is in this case added either in the form of air or as pure oxygen. An additional heating of the spent waste lye, which in other variants of the process may also be the only heating, may be performed by introducing hot steam into the oxidation reactor.

After a typical residence time of about one hour (depending on the temperature chosen and the pressure chosen), the oxidized waste lye with the associated waste gas is cooled down by means of a heat exchanger while heating the spent waste lye. After checking the pressure, the waste gas is separated from the liquid in a subsequent separating vessel. After that, the liquid oxidized waste lye may be introduced into a process for biological wastewater treatment, while optionally setting the pH (neutralization).

Further processes and process variants are described in DE 10 2006 030 855 A1, U.S. Pat. No. 4,350,599 A and the article by C. E. Ellis, "Wet Air Oxidation of Refinery Spent Caustic", Environmental Progress, volume 17, no. 1, 1998, pages 28-30.

The oxidation of the sulfur-containing compounds in the spent waste lye normally takes place in two different steps. During the oxidation of sulfides, sulfite, sulfate and thiosulfate are produced in parallel. While sulfite very quickly oxidizes further to form sulfate, the further reaction of thiosulfate is comparatively slow. The main reactions involved here are as follows:

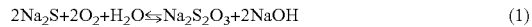

$$2Na_2S + 2O_2 + H_2O \leftrightarrows Na_2S_2O_3 + 2NaOH \quad (1)$$

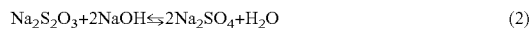

$$Na_2S_2O_3 + 2NaOH \leftrightarrows 2Na_2SO_4 + H_2O \quad (2)$$

Prior art for waste lye oxidation are an operating pressure of 6 to 40 bar and an operating temperature of up to above 200° C., for example up to 210° C. The higher the temperature in the reactor is chosen, the higher the pressure must be set, since the vapour pressure increases greatly with the temperature. The residence time in the reactor that is required for an extensive conversion falls from around the order of 12 hours at 6 bar to 10% of that residence time at 30 bar.

According to the prior art, the waste lye is fed into the oxidation reactor. An oxygen carrier, generally air, is mixed with the lye at any point desired, usually upstream of the actual reactor. The waste lye or the mixture of waste lye and oxygen carrier may be preheated in a heat exchanger.

According to the prior art, therefore, when it is fed into the oxidation reactor, the waste lye may be preheated. However, this is not absolutely necessary. Further heating (or the only heating) is often performed by means of adding steam, which may take place either into the incoming waste lye or directly into the reactor, and generally also by the reaction enthalpy or exothermicity of the oxidation reactions. As mentioned, in corresponding processes a preheating of the waste lye to the reactor may also be carried out as compared with the product from the reactor.

Since the pressure of the gas phase comprising the vapour pressure and the pressure of the oxidation air are added and the pressure of the inflowing steam must be at least as great as the reactor pressure, superheated steam especially comes into consideration for the adding of steam mentioned. This partially condenses, and in this way provides the additional heat.

According to the prior art, an oxidation reactor used for the waste lye oxidation is constructed in such a way that a directed flow forms in the reactor and, as a result, a greater reaction rate and a higher conversion are possible. For this purpose, internal fittings in the form of perforated trays may be used.

Processes of the aforementioned type are known for example from DE 10 2010 049 445 A1, in which a pressure of more than 60 bar is used in a corresponding reaction reactor, and from DE 10 2006 030 855 A1.

Because of the extreme loads, reactors for waste lye oxidation are produced from high-grade materials such as nickel-based alloys or nickel. However, even such materials can be attacked by high sulfate concentrations at elevated temperatures.

The mentioned adding of steam into the oxidation reactor is typically performed by means of one or more nozzles or lance constructions. The distribution of the steam should in this case take place as uniformly as possible over the surface area of the reactor, since the oxidation reactor, as mentioned, is typically flowed through in one direction and, as a result, the transverse mixing is limited. As explained below, in conventional processes and installations, a corresponding adding of steam cannot be controlled, or only to a slight extent.

The present invention addresses the problem of providing a process for the wet oxidation of a waste lye that makes it possible to achieve an optimum oxidation of the sulfur constituents of the waste lye, in particular at an operating pressure of 20 to 40 bar and with a minimal residence time. At the same time, the process is intended to be controllable over a wide operating range, in particular with the use of very different amounts of steam. In the process, the peak operating temperature is intended to be reduced in order to minimize the corrosion attack on the reactor material, which is especially dependent on the temperature. The present invention also addresses the problem of providing a correspondingly operable installation.

Disclosure of the Invention

Against this background, the present invention proposes a process for treating a waste lye of a lye scrub by using an oxidation reactor and a corresponding installation with the features of the respective independent patent claims. Configurations are the subject of the dependent claims and of the description which follows.

Advantages of the Invention

As repeatedly mentioned, in the process according to the prior art there is an optional preheating of the waste lye and air that are fed into a corresponding oxidation reactor. Furthermore, superheated steam is introduced into the oxidation reactor, or the waste lye present there. This steam is typically kept constantly in a mass flow independently of the operating situation at the time. Therefore, in the corresponding conventional processes the temperature in the reactor changes in a way corresponding to the fed quantity of lye. The temperature in the reactor may reach the temperature of the steam if no lye is fed in.

In such conventional processes, the adding of the superheated steam is performed by means of simple nozzles or lance constructions. The use of superheated steam has the effect of reducing the probability of steam hammering in the steam system. As a result, it is then possible for simple perforated tube constructions to be used as distributors, which then allow sufficient mixing. However, the use of superheated steam means that locally high peak temperatures on the metal cannot be ruled out. The location where the steam is fed in is the hottest point of a corresponding reactor, which makes it a critical point with respect to corrosion attack.

The construction of steam lances that are used in conventional processes makes minimizing the quantity of steam difficult to impossible. In the optimum case, the smallest quantity of steam fed in can be as a minimum 40%, in reality more likely as a minimum 60%, of the normal load, but not less. The reason for this is that, because there is an uneven flow across all of the lance holes, there is the likelihood of steam hammering occurring, due for example to local condensation and a poor distribution of the steam.

During operation in the desired pressure and temperature range of for example about 30 bar and 200° C., the difference between the desired maximum temperature of the material of the wall and the operating temperature is small. The difference is typically only 20 to 50° C. The operating temperature desired as a maximum is not to be exceeded here. Therefore, the temperature in the reactor must be controlled. This temperature control is advantageously performed by way of the quantity of steam added. This should advantageously be controllable from 0 to 100%, while a sufficient equal distribution of the steam should be ensured even in the case of small operating amounts of steam. Saturated steam or steam superheated slightly, i.e. by 5 to 10°, is appropriately used, in order to limit the maximum peak temperature.

To achieve these aims, the present invention proposes a process for treating a waste lye of a lye scrub by using an oxidation reactor, the waste lye together with oxygen or an oxygen-containing gas mixture being introduced, as mentioned, into the oxidation reactor and steam also being introduced into the oxidation reactor. According to the invention, it is provided that the steam is at least partially introduced by means of a steam feeding device, which has one or more cylindrical sections with in each case a centre axis and in each case a wall, the centre axis being aligned perpendicularly, a number of groups of openings being formed in the wall, each of the groups respectively comprising a number of the openings, and the number of openings of each of the groups being arranged in one or more planes that is or are in each case aligned perpendicularly to the centre axis. A number of cylindrical sections may be provided, in particular in relatively large reactors. For the sake of clarity, reference is made hereinafter to "a" cylindrical section, but the explanations also relate to the case where a number of cylindrical sections are provided.

By the use of a corresponding process, the advantages explained above are achieved. When reference is made hereinafter to features and advantages of configurations of processes according to the invention, they apply in the same way to installations or oxidation reactors according to the invention with corresponding steam feeding devices. The features of processes and devices according to the invention and of corresponding variants are therefore explained together.

By contrast with a horizontal pipeline provided in some known way with one or more rows of holes, within the context of the present invention steam is advantageously introduced into the reactor, and thereby into the waste lye or into a two-phase mixture of waste lye and air, exclusively by way of the mentioned cylindrical section of one or more corresponding steam feeding devices. The cylindrical section may in this case be formed as a "spigot", which is arranged perpendicularly, in particular centrally, in a corresponding reactor. A corresponding oxidation reactor is for its part typically formed at least partially cylindrically. In these cases, in particular the centre axis of the cylindrical section of the steam feeding device and a centre axis of the oxidation reactor or its cylindrical section coincide.

The fact that the cylindrical section is arranged perpendicularly and is provided within it with a number of groups of openings that are arranged in a number of planes one above the other means that condensate can collect in the cylindrical section as a result of condensation of the steam and can form a level of condensate in a way corresponding to the pressure conditions in the cylindrical section. In other words, in the process according to the invention steam in the steam feeding device or in the cylindrical section thereof is made to condense, causing the formation in the cylindrical section of a level of condensate that depends in particular on the pressure of the steam fed in.

In the case of small volumes of steam, the cylindrical section fills with condensate to a comparatively great extent and the steam only flows through those openings that are formed in planes arranged further above. In this way it can be ensured that the openings flowed through in each case are optimally subjected to steam and that optimum flow conditions are established. By contrast, in conventional arrangements all of the openings are constantly subjected to steam, but the individual openings themselves are flowed through less well. Therefore, a process proposed according to the invention has the effect that there is a more even distribution of the steam and less of a tendency for steam hammering and surging to occur. When there is a higher load, i.e. when there are higher volumes of steam, and consequently a higher pressure in the cylindrical section, the cylindrical section is progressively drained further of condensate, and further openings that are arranged in lower-lying planes are flowed through by steam, until full load is achieved.

When it is mentioned within the context of the present application that each of the groups comprises a number of openings and the numbers of openings of each of the groups are arranged in one or more planes, this should be understood as meaning that different groups can in each case respectively have openings that can be arranged above and below a reference plane. In this way, even when a corresponding reactor is slightly tilted or there are turbulences of the level of condensate in the cylindrical section, in particular because of the feeding in of the steam, a sufficient through-flow can be ensured. In the simplest case, i.e. when the numbers of openings of each of the groups are respectively arranged in a plane, numbers of rows of holes are in this case arranged one above the other, the openings of different rows of holes advantageously being respectively staggered, in order that particularly good mixing of the steam can be ensured.

Advantageously, in each of the planes the respective openings here are arranged such that they are distributed equidistantly around a circumference defined by a sectional line of the respective plane with the wall. In other words, radial lines that extend from the centre axis in the corresponding plane and pass through the respective openings form identical angles. In this way, uniform mixing can be ensured, in particular in the case of a cylindrical formation of the oxidation reactor.

In the steam feeding device that is used in a corresponding process, the openings of each of the groups are advantageously arranged in numbers of planes and a maximum distance between the planes in which the openings of one of the groups lie is smaller than a minimum distance between the planes in which the openings of two different groups lie. As already mentioned, the opening of each of the groups therefore does not have to lie in precisely one plane, but may instead also be arranged in different planes, which however lie closer to one another than the planes of two different groups.

Advantageously, two, three, four or more of the openings are arranged in each of the planes and, as mentioned, are in this case distributed equidistantly along the wall around the circumference of the cylindrical section. This produces intermediate angles between the openings of 180°, 120° and 90°, respectively. The number of openings per plane may in this case also vary. In particular, the number of openings in the first plane may be minimized, so that the least possible underload operation can be ensured.

Advantageously, the cylindrical section of the steam feeding device has a first end and a second end and is closed at the first end by a terminating area. The first end in this case points downwards and ensures that the condensate can collect in the cylindrical section. In the terminating area there may in this case be formed in particular at least one further opening, which ensures that condensate can run out from the cylindrical section. It is also possible for a number of openings to be arranged in the terminating area, the size and number of which can in particular be based on the quantity of steam respectively to be processed or fed in.

Advantageously, the cylindrical section is connected by the second end to a steam supply line and/or mounting, which extends from the second end of the cylindrical section to a wall of the oxidation reactor used. If in this case a steam supply line is provided, it may in particular be cylindrically formed and have a diameter that is the same as or different from the cylindrical section of the steam feeding device. In order to ensure easier production, the diameters are advantageously identical.

Advantageously, the openings in the cylindrical section are arranged in such a way that steam respectively flows out from this section in an outflow direction that is different from a direction in which the steam supply line and/or the mounting extends when viewed from the direction of the centre axis. In other words, the opening or openings are respectively arranged in such a way that steam flowing out through it or them is advantageously not directed towards the supply line and/or mounting in order to ensure an outflow that is as free as possible.

Overall, the diameter of the openings may be 5 to 15 mm. Advantageously, a distance between the second end and a first group of openings arranged nearest thereto is L, where L≥15 mm, particularly preferably ≥20 mm. Advantageously, the difference between at least some of the groups of openings is in this case the same and is likewise L. As a departure from this, it may be provided in particular that a distance between the mentioned first group of openings, i.e. the group of openings that lies nearest to the mounting or the steam supply line, and a second group of openings following this first group in the direction of the first end is 1.5 times L. With particular advantage, a distance between the first end of the cylindrical section, i.e. between the end at which it is closed by the terminating area, and a group of openings arranged nearest thereto, is therefore M, where M corresponds in particular to 1.5 times the diameter of the openings.

As mentioned, the holes or openings in different groups are arranged offset in relation to one another, in particular are staggered in relation to one another. As likewise mentioned, the openings are advantageously arranged in such a way that the steam jet forming is only influenced little by the supply line or the supports of the steam feeding device. If for example three openings are used, the angle of respective radial lines that extend through the openings from the centre line is 120°. A radial line that extends from the centre line in the direction of one of the openings is advantageously aligned at 60° to the axis of a corresponding support or a supply line. If four openings are used, and the angle between the respective radial lines is 90°, the radial lines are advantageously aligned at 45° to the axis of the support.

Advantageously, the openings are surrounded by steam conducting structures, which may be formed as nozzles or simple bores in the wall. These define an outflow direction for the steam from the corresponding openings. The outflow direction corresponds to a radial direction starting from the centre axis in the respective plane or is inclined by up to 30° with respect to it.

When it is mentioned above that a steam supply line is used, it is advantageously closed on a side that is not flowed through, or is advantageously provided with drainage bores.

By contrast with the prior art, the velocity of the steam in the steam supply line may correspond to the velocity of the steam in the respective bores. In conventional devices, on the other hand, the former is always greater by a factor of more than 5. Within the context of the present invention, a steam velocity that advantageously corresponds at least to the velocity of the steam in the openings, and is preferably greater than the latter by more than a factor of 1.5, may be used or set in the supply line. In all cases, the steam velocity in the supply line may however in this case be below 10 times, 5 times or 2 times the steam velocity in the openings.

A further advantage of the measures proposed according to the invention is that the pressure loss of the supply line has a minimal influence on the through-flow of the openings, since the openings are arranged centrally, and consequently operate virtually with the same preliminary pressure. In the case of conventional longitudinal distributors (steam lances), a high pressure loss leads to a great change in the through-flow of the nozzles over the length of the longitudinal distributor.

Within the context of the present invention, the steam velocity in the openings or the minimum velocity may be fixed by means of the so-called Froude number (Fr), a usual criterion being Fr>6. The maximum velocity is fixed on the basis of the erosional velocity with respect to steam and lance material. The target value in said use is 10 to 65 metres per second, in particular 20 to 30 metres per second.

An installation and an oxidation reactor with corresponding features are likewise the subject of the present invention. For features and advantages of this installation and this oxidation reactor, reference is made expressly to the above explanations and the corresponding patent claims.

The invention is explained in more detail below with reference to the appended drawings, which illustrate a preferred configuration of the present invention.

BRIEF DESCRIPTION OF THE DRAWINGS

FIG. 1 illustrates in a schematic partial representation an oxidation reactor for use in an installation according to an embodiment of the invention.

FIG. 2A illustrates a steam feeding device for use in an installation according to an embodiment of the invention in a first configuration.

FIG. 2B illustrates a steam feeding device for use in an installation according to to an embodiment of the invention in a second configuration.

In the figures, elements that functionally or structurally correspond to one another are respectively indicated by identical designations. For the sake of clarity, said elements will not be discussed repeatedly.

DETAILED DESCRIPTION OF THE DRAWINGS

In FIG. 1, a section of an oxidation reactor for use in an installation according to a configuration of the present invention is schematically illustrated in a greatly simplified form and is denoted overall by 100. The oxidation reactor 100 has a wall 110, which encloses an interior space 120 of the oxidation reactor 100. A waste lye or a mixture of waste lye and air may be received in the interior space 120 and conducted for example substantially in the direction of the arrows respectively indicated by 130.

As mentioned, in particular the oxidation air and the waste lye may be heated up before being fed into the oxidation reactor 100. Additional heating may take place by means of a stream of steam 140, which is introduced into the oxidation reactor 100 or into the waste lye received in the latter, as illustrated here by means of a steam feeding device 10.

The steam feeding device 10 in this case comprises a cylindrical section 11, which has a centre axis 12, which may in particular correspond overall to a centre axis of the oxidation reactor 100. The cylindrical section 11 comprises a wall 13. The centre axis 12 is aligned perpendicularly. Arranged in the wall 13 are a number of openings 14, which are only partially provided with designations. The openings 14 are arranged in numbers of groups, each of the groups comprising numbers of openings 14 and the numbers of openings of each of the groups being arranged in one or more planes, which have been illustrated here by dashed lines and are denoted by 15.

The planes 15 are in each case aligned perpendicularly to the centre axis 12. In other words, the centre axis 12 intersects the planes 15 perpendicularly. In this way, numbers of rows of openings 14 or rows of holes are formed within the context of the present invention, allowing condensate to build up in the cylindrical section 11, and steam only being introduced into the interior space 120 of the oxidation reactor 100, or into the waste lye present there, through the openings 14 that remain free. In this way, a corresponding oxidation reactor 100 can be operated in an optimized manner, as repeatedly explained above.

As explained, the openings 14 in the various planes 15 are provided in the same or different numbers, in a plane 15 represented here at the top in particular it only being possible for a relatively small number of openings to be provided, in order to make a minimum load possible. For the distances $I_0$ and $I_1$ of the individual planes 14 from one another and with respect to the cylindrical section 11, reference should be made expressly to the above explanations.

At a lower end or first end, the cylindrical section 11 is closed by a terminating area 16, in which at least one further opening 17 is arranged. At an opposite second end of the cylindrical section 11, the latter is connected to a steam supply line 18, which may have a diameter that is the same as or different from the cylindrical section. The row of openings 14 lying nearest the steam supply line 18 advantageously has in this case the smallest number of openings 14. The formation and alignment of the respective openings 14 have been explained in detail above. The steam supply line 18 is closed at one end by a closure, or it has one or more further openings 20.

In FIG. 2A, the steam feeding device 10, which is already illustrated in FIG. 1 as part of the oxidation reactor 100, is represented in a different perspective, here a plan view along the axis 12 according to FIG. 1 being illustrated from below. As represented here, the openings 14 are in this case arranged in the cylindrical section 11 in such a way that an outflow direction for steam that is defined by them deviates from a centre axis of the steam supply line 18.

If in this case, as shown in the example represented in FIG. 2A, three openings are illustrated in a plane, an intermediate angle between them is 120°, and they are inclined at the angle represented of 60° with respect to a perpendicular to the centre axis of the supply line 18.

In FIG. 2B, the corresponding conditions already represented in FIG. 2A are represented for the case where four openings 14 are provided in a plane 15 of a corresponding cylindrical section 11.

The invention claimed is:

1. A process for treating a waste lye obtained in a lye scrub by using an oxidation reactor (100), wherein the waste lye together with oxygen or an oxygen-containing gas mixture is introduced into the oxidation reactor (100) and steam is also introduced into the oxidation reactor (100), wherein the steam is at least partially introduced by means of a steam feeding device (10), having a cylindrical section (11), the cylindrical section having a centre axis (12) and a wall (13), the wall having a first end and a second end, wherein the first end points downwards and the cylindrical section (11) is closed at the first end by an end surface (16) so that condensate can collect in the cylindrical section (11) by condensation of the steam, the centre axis (12) aligned vertically, and wherein a number of groups of openings (14) are formed in the wall, each of the groups respectively comprising a number of the openings (14), and the number of openings (14) of each of the groups being arranged in one or more planes (15), wherein each plane is perpendicular to the centre axis (12).

2. The process according to claim 1, in which the openings (14) in each of the planes (15) are arranged such that they are distributed equidistantly around a circumference defined by a sectional line of the respective plane (15) with the wall (13).

3. The process according to claim 1, in which the openings (14) in each of the groups are arranged in numbers of planes (15) and a maximum distance between the planes (15) in which the openings (14) of one of the groups lie is smaller than a minimum distance between the planes (15) in which the openings (14) of two different groups lie.

4. The process according to claim 1, in which two, three, four or more of the openings (14) are arranged in each of the planes (15).

5. The process according to claim 1, in which at least one further opening (17) is formed in the terminating area (16).

6. The process according to claim 1, in which the cylindrical section is connected by the second end to a steam supply line (18) and/or mounting, which extends from the second end of the cylindrical section (11) to a wall (110) of the oxidation reactor (100).

7. The process according to claim 6, in which the openings (14) are arranged in such a way that steam respectively flows out from them in an outflow direction that is different from a direction in which the steam supply line (18) and/or the mounting extends when viewed from the direction of the centre axis (12).

8. The process according to claim 1, in which a distance between the second end and a first group of openings (14) arranged nearest thereto is L, where L is greater than or equal to 15 mm.

9. The process according to claim 8, in which a distance between at least some of the groups of openings is the same and is L.

10. The process according to claim 9, in which a distance between the first group of openings and a second group of openings following this first group in the direction of the first end is 1.5 times L.

11. The process according to claim 1, in which a distance between the first end and a group of openings (14) arranged nearest thereto is greater than M, where M corresponds to 1.5 times a diameter of the openings (14).

12. The process according to claim 1, in which the openings (14) are surrounded by steam conducting structures, which define an outflow direction which corresponds to a radial direction starting from the centre axis in the respective plane or is inclined by up to 30° with respect to it.

* * * * *